United States Patent
Liu et al.

(10) Patent No.: US 8,569,692 B1
(45) Date of Patent: Oct. 29, 2013

(54) MEASUREMENT SYSTEM WITH THICKNESS CALCULATION AND METHOD OF OPERATION THEREOF

(71) Applicant: Applied Materials, Inc., Santa Clara, CA (US)

(72) Inventors: Biao Liu, San Jose, CA (US); Chikuang Wang, San Jose, CA (US); Yuri Uritsky, Newark, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 13/714,368

(22) Filed: Dec. 13, 2012

(51) Int. Cl.
*G21K 7/00* (2006.01)

(52) U.S. Cl.
CPC ........................ *G21K 7/00* (2013.01)
USPC .......................................... 250/306; 250/307

(58) Field of Classification Search
USPC .................................................. 250/306, 307
See application file for complete search history.

(56) References Cited

U.S. PATENT DOCUMENTS

| | | | |
|---|---|---|---|
| 5,299,252 A | 3/1994 | Takahashi | |
| 5,657,363 A | 8/1997 | Hossain et al. | |
| 6,787,773 B1 * | 9/2004 | Lee | 250/311 |
| 8,065,094 B2 * | 11/2011 | Statham | 702/28 |

OTHER PUBLICATIONS

Ritchie, "Spectrum Simulation with Nist Monte", "National Insitute of Standards and Technology", 2005, pp. 1290-1291, vol. 11, Publisher: Microsc Microanal.

\* cited by examiner

*Primary Examiner* — Kiet T Nguyen
(74) *Attorney, Agent, or Firm* — Ishimaru & Associates LLP

(57) ABSTRACT

A method of operation of a measurement system includes: providing a specimen having a film; controlling a beam generator to direct a charged particle beam into the specimen; detecting a reference signal emitted from the specimen; normalizing the reference signal to create a film L-ratio; and determining a thickness of the film by correlating the film L-ratio to a calibration curve.

20 Claims, 5 Drawing Sheets

MEASUREMENT SYSTEM WITH THICKNESS CALCULATION AND METHOD OF OPERATION THEREOF

TECHNICAL FIELD

The present invention relates generally to a measurement system and more particularly to a system for a measurement system with thickness calculation.

BACKGROUND ART

The rapidly growing market for portable electronic devices, e.g. cellular phones, laptop computers, and tablet computers, is an integral facet of modern life. The multitude of portable devices represents one of the largest potential market opportunities for next generation manufacturing. These devices have unique attributes that have significant impacts on manufacturing integration, in that they must be generally small, lightweight, and rich in functionality and they must be produced in high volumes at relatively low cost.

As an extension of the semiconductor industry, the electronics manufacturing industry has witnessed ever-increasing commercial competitive pressures, along with growing consumer expectations and the diminishing opportunities for meaningful product differentiation in the marketplace.

Manufacturing, materials engineering, and development are at the very core of these next generation electronics insertion strategies outlined in road maps for development of next generation products. Future electronic systems will be more intelligent, have higher density, use less power, operate at higher speed, and include mixed technology devices and assembly structures at lower cost than today.

There have been many approaches to addressing the advanced manufacturing requirements of microprocessors and portable electronics with successive generations of semiconductors. Many industry road maps have identified significant gaps between the current semiconductor capability and the available supporting electronic manufacturing technologies. The limitations and issues with current technologies include increasing clock rates, electromagnetic interference, thermal loads, second level assembly reliability stresses, and cost.

As these manufacturing systems evolve to incorporate more components with varied environmental needs, the pressure to push the technological envelope becomes increasingly challenging. More significantly, with the ever-increasing complexity, the potential risk of error increases greatly during manufacture unless monitoring during the fabrication process is performed.

Thin films are an essential part of fabricating electronics. Thickness measurements for thin films are normally done by optical or X-ray based techniques in a fast and non-destructive fashion. The X-ray or optical techniques can include Ellipsometry, X-Ray Reflectivity (XRR), or X-Ray Fluorescence (XRF). The common inherent disadvantage of such techniques is the big measurement spots, the sizes of which are usually from several millimeters to several tens of microns. Therefore, for the purpose of tuning and monitoring of the thin film deposition processes, such measurements are usually performed either on blank substrates (e.g., silicon wafer) or on specially designed monitor pads on patterned wafers.

Since the behavior of the thin film deposition processes on small patterned structures is often different from their behavior on the large monitor areas, the thickness results obtained cannot be used directly to assess the thickness on the small patterned structures. Due to such a limitation of the above mentioned thickness measurement techniques, scanning electron microscopy or transmission electron microscopy (TEM) imaging coupled with focus ion beam (FIB) or manual cross section, is often used to directly measure the thickness of the thin films on the small patterned structures.

The cross section imaging is performed either on finished devices or on specially designed sacrificial patterns on patterned wafers. Either solution can be very expensive. Another disadvantage of the cross section imaging is that it is extremely slow. The whole process of cross section imaging of even one sampling spot often takes several hours to finish; therefore, it cannot achieve the statistical precision that can be achieved by the optical and X-ray based metrology techniques.

An additional metrology challenge is measurement close to a substrate edge. As the integrated circuit (IC) manufactures strive to utilize more of the usable area of the wafer, film uniformity close to the very edge of the wafer is required and consequently measurements with two millimeters (mm) or even one-millimeter edge exclusion are demanded. The optical and X-ray based metrology tools have difficulty fulfilling such requirement because of their large spot sizes and the requirement of a flat substrate at the very edge of the wafer.

In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Thus, a need remains for thickness measurements of thin films on patterned wafers and especially those on the small patterned structures. Solutions to these problems have been long sought but prior developments have not taught or suggested any solutions and, thus, solutions to these problems have long eluded those skilled in the art.

DISCLOSURE OF THE INVENTION

The present invention provides a method of operation of a measurement system including: providing a specimen having a film; controlling a beam generator to direct a charged particle beam into the specimen; detecting a reference signal emitted from the specimen; normalizing the reference signal to create a film L-ratio; and determining a thickness of the film by correlating the film L-ratio to a calibration curve.

The present invention provides a measurement system, including: a control module for providing a specimen having a film; a beam generator, coupled to the control module, for directing a charged particle beam into the specimen; a detector, coupled to the beam generator, for detecting an reference signal emitted from the specimen; and an analysis unit, coupled to the detector, for normalizing the reference signal to create a film L-ratio and determining a thickness of the film by correlating the film L-ratio to a calibration curve.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
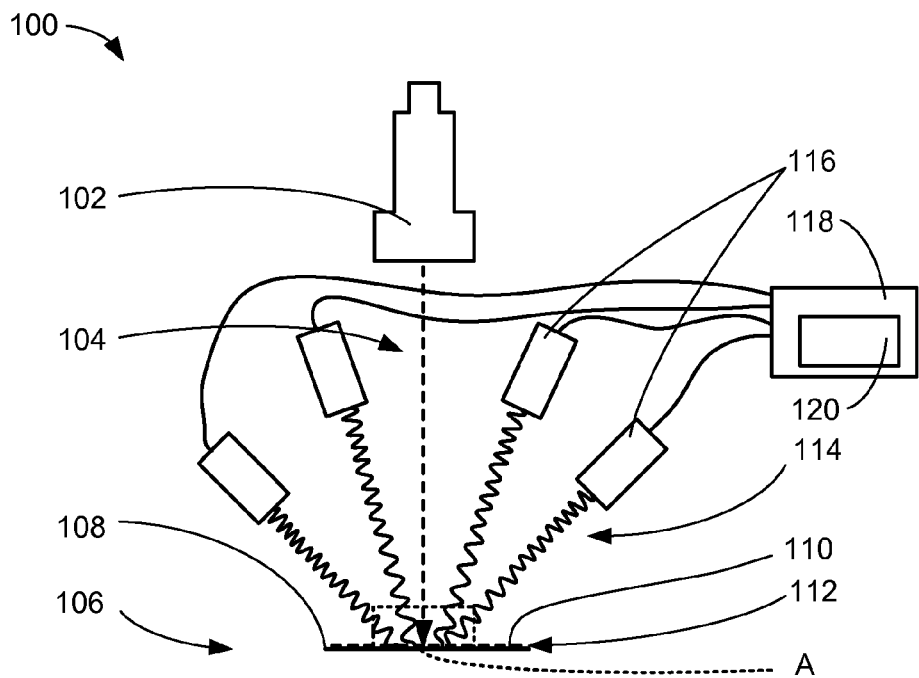
FIG. 1 is a cross-sectional view of a measurement system in an embodiment of the present invention.

The following embodiments are described in sufficient detail to enable those skilled in the art to make and use the invention. It is to be understood that other embodiments would be evident based on the present disclosure, and that system, process, or mechanical changes can be made without departing from the scope of the present invention.

In the following description, numerous specific details are given to provide a thorough understanding of the invention. However, it will be apparent that the invention can be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. In addition, where multiple embodiments are disclosed and described having some features in common, for clarity and ease of illustration, description, and comprehension thereof, similar and like features one to another will ordinarily be described with similar reference numerals.

For expository purposes, the term "horizontal" as used herein is defined as a plane parallel to a top surface of the substrate, regardless of its orientation. The term "vertical" refers to a direction perpendicular to the horizontal as just defined. Terms, such as "above", "below", "bottom", "top", "side" (as in "sidewall"), "higher", "lower", "upper", "over", and "under", are defined with respect to the horizontal plane, as shown in the figures. The term "on" means that there is direct contact between elements without having any intervening material.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a microelectromechanical system (MEMS), passive devices, environmental sensors including temperature sensors, or a combination thereof.

Referring now to FIG. 1, therein is shown a cross-sectional view of a measurement system 100 in an embodiment of the present invention. The measurement system 100 can include techniques including scanning electron microscopy (SEM), energy dispersive spectroscopy (EDS), and wavelength dispersive spectroscopy (WDS) for film thickness and non-uniformity measurement on patterned or blank film.

The measurement system 100 can use SEM-, EDS-, or WDS-based technique for thickness measurements of thin films on patterned wafers and especially those on the small patterned structures. The same technique can be suitable for the thickness measurements on blanket wafers with zero edge-exclusion requirements. The measurement system 100 can use a SEM together with an energy dispersive X-ray detector (EDX), a wavelength λ-ray detector (WDX), or a combination thereof to detect characteristic X-rays from a thin film and silicon (Si) substrate from areas of interest on the wafer.

The measurement system 100 is shown having a beam generator 102, which directs a charged particle beam 104 toward a specimen 106. The beam generator 102 produces the charged particle beam 104 as an electron beam. The beam generator 102 can be a scanning electron microscope or an electron emitter such as a thermionic emitter, a photocathode emitter, a cold emission emitter, or a plasmas source emitter.

The charged particle beam 104 can be directed toward the specimen 106. The specimen 106 can be a substrate 108 having a film 110 formed thereon. The substrate 108 is defined as a structure capable of providing structural support for components or the film 110 formed there over. The substrate 108 can be a support structure including a silicon substrate, gallium arsenide substrate, carbon substrate, or ceramic substrate.

The charged particle beam 104 can impact the specimen 106 with enough energy to penetrate the film 110 and the substrate 108. The charged particle beam 104 can impact the specimen 106 in a diameter of less than 10 micrometers (μm); however, the size of the charged particle beam 104 impact can range between 1-100 μm in diameter.

It has been discovered that utilizing the beam generator 102 impinging the specimen 106 with the charged particle beam 104 allows for small measurement spots down to 1 μm. The small measurement spots enable measurements of the film 110 on the substrate 108 of wafers with a zero-edge exclusion requirement. The zero-edge exclusion requirement allows the film 110 to be formed at edges of the substrate 108 such that edges of the film 110 and the substrate 108 substantially aligned with each other resulting in peripheral areas at the edges of the substrate 108 completely utilized with the film 110 directly formed thereon.

The film 110 can be formed above the substrate 108 to cover the substrate 108. The substrate 108 and the film 110 can be processed to include a pattern 112. The pattern 112 is a complex geometric pattern with multi-sided structures formed in the substrate 108 and the film 110. For example, the pattern 112 can be a line and trench pattern or other geometric patterns. The film 110 can be a metallic or oxide film such as copper (Cu), aluminum, or silicon oxide.

The charged particle beam 104 can bombard the specimen 106 and interact with the substrate 108 and the film 110 to emit reference signals 114. The reference signals 114 can include energies in a range of 100 ($10^2$) electron volts (eV) to $10^5$ electron volts (eV) or frequencies in a range of $3 \times 10^{16}$ hertz (Hz) to $3 \times 10^{29}$ hertz (Hz). For example, the reference signals 114 can be a frequency of an electromagnetic radiation including X-rays, Auger electrons, or any other energy sources.

The charged particle beam 104 can be deflected in an elastic scattering event or absorbed by the specimen 106 in an inelastic scattering event that changes the energy of the charged particle beam 104 after impact. When the charged particle beam 104 interacts in an inelastic way with the specimen 106, the charged particle beam 104 excites electrons within inner orbitals of atoms (not shown) within the specimen 106. These electrons can be ejected from the inner orbitals leaving an electron hole. When a higher energy electron from the atom fills the hole, the electron emits electromagnetic radiation in the form of the reference signals 114.

The film 110 and the substrate 108 can have unique atomic structures (not shown). When the charged particle beam 104 interacts in an inelastic way with the film 110 or the substrate 108 to produce the reference signals 114, the frequency signal or energy of the reference signals 114 will be different for the substrate 108 and for the film 110 because of the unique atomic structures.

The reference signals 114 can be detected by detectors 116 positioned above the specimen 106. The detectors 116 can be dispersive spectrometers such as energy-dispersive spectrometers, wavelength-dispersive spectrometers, electron dispersive X-ray spectroscopy, wavelength dispersive X-ray spectroscopy, or a combination thereof. The detectors 116 can detect the reference signals 114 resulting from inelastic interaction between the charged particle beam 104 and the specimen 106. For example, the detectors 116 can be electromagnetic radiation detectors including X-ray receivers with counters.

The detectors 116 can be coupled to an analysis unit 118. The analysis unit 118 is configured to analyze the reference signals 114 collected by the detectors 116. The analysis unit 118 can be a processing system or computing system such as a personal computer or a workstation.

The analysis unit 118 can include a calculation module 120. The calculation module 120 is a structure that provides part of a class of computational algorithms that rely on repeated random sampling to compute a property. The calculation module 120 can be applied with the analysis unit 118 as a computer simulation of an electron-atom interaction and associated events including generation of the reference signals 114 by the inelastic interaction of the charged particle beam 104 with the film 110 or the substrate 108. For example, the calculation module 120 can be implemented using a computational algorithm including a Monte Carlo method.

The analysis unit 118 utilizes the calculation module 120 to determine how thick the film 110 is over the substrate 108 based on the random interaction of the charged particle beam 104 with the film 110 and the substrate 108. Examples of the Monte Carlo method are the National Institute of Standards and Technology Desktop Spectrum Analyzer II (DTSA-II) and the Cambridge quantum Monte Carlo code CASINO.

Figure 2:
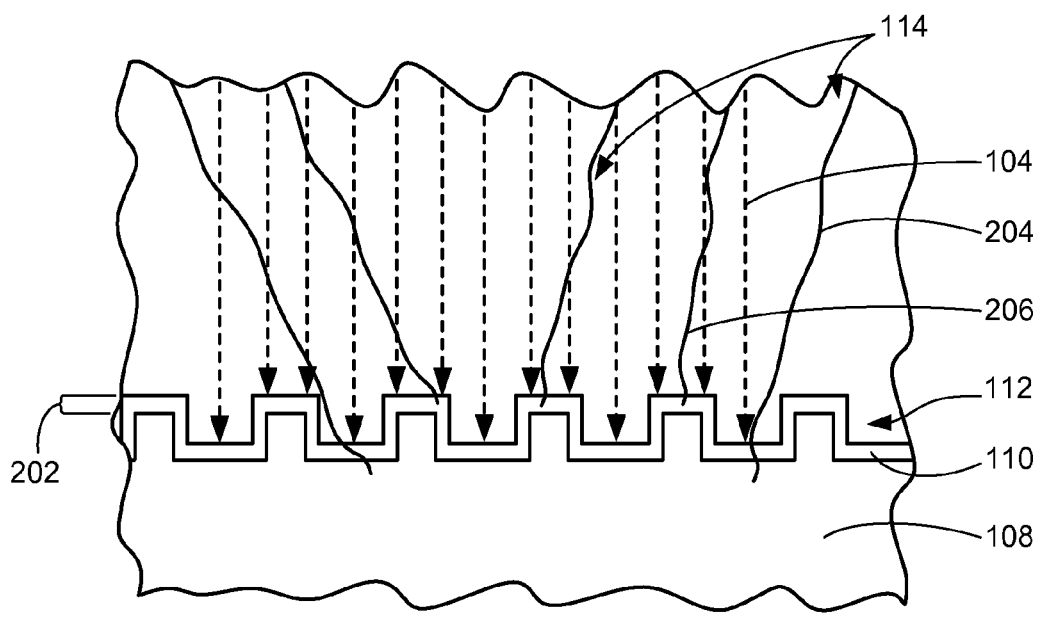
FIG. 2 is a magnified cross-sectional view of section A of FIG. 1.

Referring now to FIG. 2, therein is shown a magnified cross-sectional view of section A of FIG. 1. Section A shows the substrate 108 and the film 110 in greater detail. The substrate 108 and the film 110 are shown having the pattern 112 formed therein.

The film 110 is shown covering the substrate 108 and having the pattern 112 formed therein. The film 110 is also shown having a thickness 202. The thickness can vary over the substrate 108 and within the pattern 112.

The charged particle beam 104 is shown scanning across the pattern 112 and is shown impacting the film 110 and the substrate 108 generating the reference signals 114. The charged particle beam 104 can scan over the pattern 112 with a raster (side to side then incrementing ninety degrees) motion, with a highly localized pinpoint sampling motion or defocused point over several repeat units of the pattern 112 at different locations on the substrate 108.

The charged particle beam 104 can impact the pattern 112 of the film 110 and the substrate 108 randomly with elastic or inelastic interactions. The reference signals 114 can be substrate signals 204 or film signals 206. The film signals 206 are the reference signals 114 that are emitted from the interaction between the charged particle beam 104 and the film 110. The substrate signals 204 are the reference signals 114 that are emitted from the interaction between the charged particle beam 104 and the substrate 108.

Figure 3:
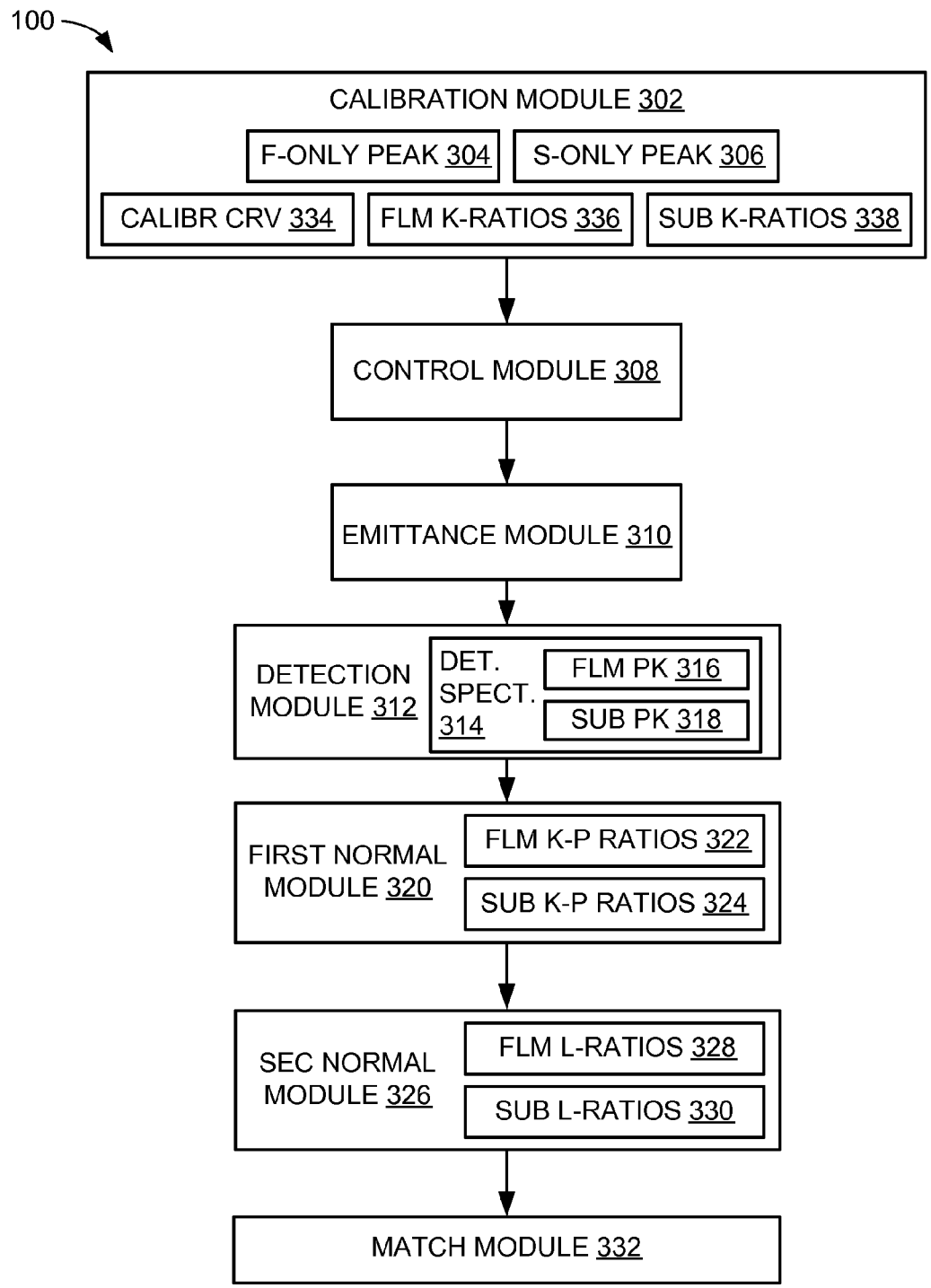
FIG. 3 is a control flow of the measurement system.

Referring now to FIG. 3, therein is shown a control flow of the measurement system 100. The measurement system 100 is shown having a calibration module 302. The calibration module 302 stores signals measured by the detectors 116 of FIG. 1 for various predetermined references including elements from the film 110 of FIG. 1 and the substrate 108 of FIG. 1. For example, the predetermined references can be known standards that are used as references for comparison or calculation purposes.

The calibration module 302 can determine or detect a film-only peak 304 and a substrate-only peak 306. The film-only peak 304 is a peak intensity of the reference signals 114 of FIG. 1 when the charged particle beam 104 of FIG. 1 interacts only with a bulk predetermined reference including the same element(s) as in the film 110. The substrate-only peak 306 is a peak intensity of the reference signals 114 when the charged particle beam 104 interacts only with a bulk predetermined reference including the same element(s) as in the substrate 108. The term "bulk" refers to a reference or a material into which the charged particle beam 104 penetrates into but cannot go through it.

Depending on the structure to be analyzed, one signal in the calibration module 302 can be used as film-only reference or substrate-only reference. All the signals stored in the calibration module 302 are measured under the same conditions. For example, in case of EDS, it would be the same configuration setup as in FIG. 1 and the same electron beam energy and dose (current×time).

For example, other materials different from copper can be used for the film 110 in semiconductor processing. As a specific example, the other materials can include Tantalum, Hafnium, Tungsten, Titanium, Aluminum, Germanium, Cobalt, and their compounds including oxides and nitrides. Also for example, a table of data or information can be generated using Monte Carlo simulation results for K-ratios and L-ratios for various thicknesses of the film 110 for each of the other materials and different structures.

The calibration module 302 can obtain the film-only peak 304 and the substrate-only peak 306 whenever the configuration of the beam generator 102 of FIG. 1 or the detectors 116 has changed. The calibration module 302 can be implemented using the beam generator 102 and the detectors 116. The calibration module 302 can further process the reference signals 114 within the analysis unit 118 of FIG. 1 to identify the film-only peak 304 and the substrate-only peak 306.

The calibration module 302 can be coupled to a control module 308. The control module 308 provides the introduction of the specimen 106 of FIG. 1 to be tested. Once the specimen 106 is positioned properly below the beam generator 102, the control module 308 invokes an emittance module 310 coupled to the control module 308.

The emittance module 310 controls the beam generator 102 and directs the charged particle beam 104 toward the specimen 106. When the charged particle beam 104 impacts the specimen 106, a detection module 312, coupled to the emittance module 310, can be invoked.

The detection module 312 returns a detection spectrum 314 from the analysis unit 118 based on the reference signals 114 detected by the detectors 116. The detection spectrum 314 can be a frequency spectrum including an X-ray spectrum obtained from energy dispersive spectroscopy or from wavelength dispersive spectroscopy.

The detection spectrum 314 for the specimen 106 can be most conveniently obtained by the calculation module 120 of FIG. 1. As an example, a particular thin film or thin film stack with defined thickness, composition and stack structure, and pattern geometry (including the simplest case of no pattern) can be obtained by the calculation module 120.

The calculation module 120 has been proven to accurately simulate the detection spectrum 314 including an EDS spectrum. Therefore, the calculation module 120 can be set up for a series of different conditions corresponding to the variables of interest, e.g. thickness, and generate a curve for calibration, which can be used for the EDS from real acquisition.

The calculation module 120 can model the detection spectrum 314 having a film peak 316 and a substrate peak 318 based on the film signals 206 of FIG. 2 and the substrate signals 204 of FIG. 2, respectively. The film peak 316 and the substrate peak 318 are peak intensities of the reference signals 114 detected by the detectors 116 and analyzed using the calculation module 120 by the analysis unit 118. The film signals 206 and the substrate signals 204 can be used in the calculation module 120 as variables of corresponding to the thickness 202 of FIG. 2.

The film peak 316 is a signal intensity collected from the film 110 as a sample to be measured. For example, the sample to be measured can be a thin film on a patterned substrate. The substrate peak 318 is a signal intensity collected from the substrate 108 as a sample to be measured. The film peak 316 and the substrate peak 318 are measured at the same conditions. For example, in case of EDS, all the signals can be collected simultaneously by the detectors 116 resulting in no extra requirements.

The film peak 316 and the substrate peak 318 can be output from the detection module 312 to a first normalization module 320. The term normalize is defined as conforming data to those data stored in the first normalization module 320 to eliminate energy function differences of the detectors 116 as used in different systems and simulations. K-prime ratios (K'-ratios) can be obtained for elements from both the film 110 and the substrate 108. K-prime denotes a difference compared to a predetermined K-ratio, where the dose of charged particles are to be the same for both spectra, which is not required here for the K-prime ratios. The K-prime ratios become the predetermined K-ratio when the doses are the same.

Film K-prime ratios 322 of the film 110 can be calculated by Equation 1:

$$K'(A) = \frac{\text{Intensity}_{film}^{ElementA}}{\text{Intensity}_{standard}^{ElementA}}, \quad \text{(Equation 1)}$$

where $\text{Intensity}_{film}^{ElementA}$ denotes an intensity from the detection module 312 associated film with a film element A characterized or identified by the film peak 316 and $\text{Intensity}_{standard}^{ElementA}$ denotes an intensity from the detection module 312 associated with the film element A from a predetermined reference having element A characterized or identified by the film-only peak 304.

Substrate K-prime ratios 324 can be calculated by Equation 2:

$$K'(B) = \frac{\text{Intensity}_{film}^{ElementB}}{\text{Intensity}_{standard}^{ElementB}}, \quad \text{(Equation 2)}$$

where $\text{Intensity}_{substrate}^{ElementB}$ denotes an intensity from the detection module 312 associated with the substrate 108 characterized or identified by the substrate peak 318 and $\text{Intensity}_{standard}^{ElementB}$ denotes an intensity from the detection module 312 associated with the substrate 108 characterized or identified by the substrate-only peak 306. The film K-prime ratios 322 and the substrate K-prime ratios 324 eliminate influences from the detectors 116.

It has been discovered that the film K-prime ratios 322 and the substrate K-prime ratios 324 allow measurement of the specimen 106 having complex geometry directly without the need for blank substrate measurement, specially designed monitor pads, or cross-section imaging. This has been shown to increase process control allowing tighter quality standards during fabrication. It has further been discovered that utilizing the film K-prime ratios 322 and the substrate K-prime ratios 324 allow the faster tool maintenance and qualification by removing irregularities in the configuration of the beam generator 102 and the detectors 116 thus reducing expense and eliminating measurement variability resulting in improved accuracy.

The film K-prime ratios 322 and the substrate K-prime ratios 324 outputs from the first normalization module 320 can be input into a second normalization module 326 coupled to the first normalization module 320. The second normalization module 326 generates film L-ratios 328 to normalize the film K-prime ratios 322 for intensity. The film L-ratios 328 can be calculated by Equation 3:

$$L(\text{film}) = \frac{K'(\text{film})}{K'(\text{film}) + K'(\text{substrate})}, \quad \text{(Equation 3)}$$

The second normalization module 326 generates substrate L-ratios 330 to normalize the substrate K-prime ratios 324 for intensity. The substrate L-ratios 330 can be calculated by Equation 4:

$$L(\text{substrate}) = \frac{K'(\text{substrate})}{K'(\text{film}) + K'(\text{substrate})}, \quad \text{(Equation 4)}$$

where K'(film) denotes the film K-prime ratios 322 and K'(substrate) denotes the substrate K-prime ratios 324. L-ratios of either the film 110 or the substrate 108 can be used. The film L-ratios 328 and the substrate L-ratios 330 eliminate influences from control of the dose of the charged particle beam 104 and energy function of the detectors 116.

It has been discovered that the film L-ratios 328 and the substrate L-ratios 330 have the special property of being constant regardless of current changes in the charged particle beam 104 thereby allowing increased capacity and reduced measurement time because detection and calculation of the thickness 202 based on the film L-ratios 328 and the substrate L-ratios 330 does not need extremely refined control over current and exposure time of the charged particle beam 104.

The second normalization module 326 can be implemented in the analysis unit 118. The output of the second normalization module 326 can be input into a match module 332 coupled to the second normalization module 326 and implemented on the analysis unit 118. The match module 332 matches the film L-ratios 328 of the second normalization module 326 to a calibration curve 334 generated by the calibration module 302.

The calibration curve 334 has been discovered and shown as a graph correlating the film L-ratios 328 to the thickness 202 of the film 110 providing improved method for calculation of the thickness 202. The calibration curve 334 can be established by using the detection spectrum 314 to calculate the film L-ratios 328 to a series of the film 110 that has been prepared with a predetermined value of the thickness 202. The calibration curve 334 can also be established using Monte Carlo simulation to simulate the spectra for a pattern structure of the film 110 with a series of the thickness 202 of the film 110 and simulate the spectra of same standard or reference as in the calibration module 302 to construct the film L-ratios 328.

As an example, the thickness 202 of a copper film, film K-ratios 336 of the copper film, substrate K-ratios 338 of a silicon substrate, and the film L-ratios 328 can be represented in Table 1 as:

TABLE 1

| Cu Thickness | K-Ratio | | L-Ratio |
|---|---|---|---|
| (nm) | Cu | Si | Cu/(Cu + Si) |
| 0 | 0 | 1 | 0 |
| 5 | 0.079 | 0.887 | 0.082 |
| 10 | 0.164 | 0.757 | 0.178 |
| 15 | 0.251 | 0.647 | 0.279 |
| 20 | 0.357 | 0.538 | 0.399 |
| 25 | 0.443 | 0.433 | 0.506 |
| 30 | 0.538 | 0.344 | 0.610 |
| 35 | 0.627 | 0.265 | 0.703 |
| 40 | 0.696 | 0.208 | 0.770 |
| 45 | 0.742 | 0.160 | 0.823 |
| 50 | 0.826 | 0.106 | 0.886 |
| 100 | 0.995 | 0.004 | 0.996 |

Table 1 can be generated based on Monte Carlo simulation results for the film K-ratios 336, the substrate K-ratios 338, and the film L-ratios 328 for various thicknesses of the film 110 of copper on the substrate 108 of silicon. The simulation is based on the assumptions of the film 110 having a certain density, the film 110 having the pattern 112 of FIG. 1 with a certain geometry, the charged particle beam 104 running at 5 kilo-electron volts (keV) energy and at normal incidence, and the detectors 116 having a 35-degree take-off angle.

The calibration curve 334 can be generated by graphing the film L-ratios 328 and the thickness 202 of the film 110 in Table 1. The thickness 202 of the film 110 is shown in nanometers (nm).

When the thickness 202 of the film 110 decreases, the film K-ratios 336 can be closer to zero indicating a large difference between the film-only peak 304 and the film signals 206. As the thickness 202 increases near 100 nm, the film peak 316 converges with the film-only peak 304 and the film K-ratios 336 become closer to one. This indicates that the film signals 206 detected by the detectors 116 from the charged particle beam 104 interactions with the pattern 112 differ less, from the film-only peak 304, as the thickness 202 increases.

Conversely, the substrate K-ratios 338 are closest to one when the thickness 202 is small and move toward zero when the thickness 202 increases. This indicates that the substrate signals 204 are closer to the substrate-only peak 306 when the thickness 202 is low but diverge from the substrate-only peak 306 as the thickness 202 increases.

A different beam voltage (energy) can be set up to accommodate film thicknesses. Table 1 shows the film L-ratios 328 become 1 (maximum) for the thickness 202 of the film 110 larger than 100 nm. To measure thicker films, larger beam voltage (e.g., 10 kV or more) can be used. Either the film L-ratios 328 of the film 110 or the substrate L-ratios 330 of the substrate 108 can be used.

Figure 4:
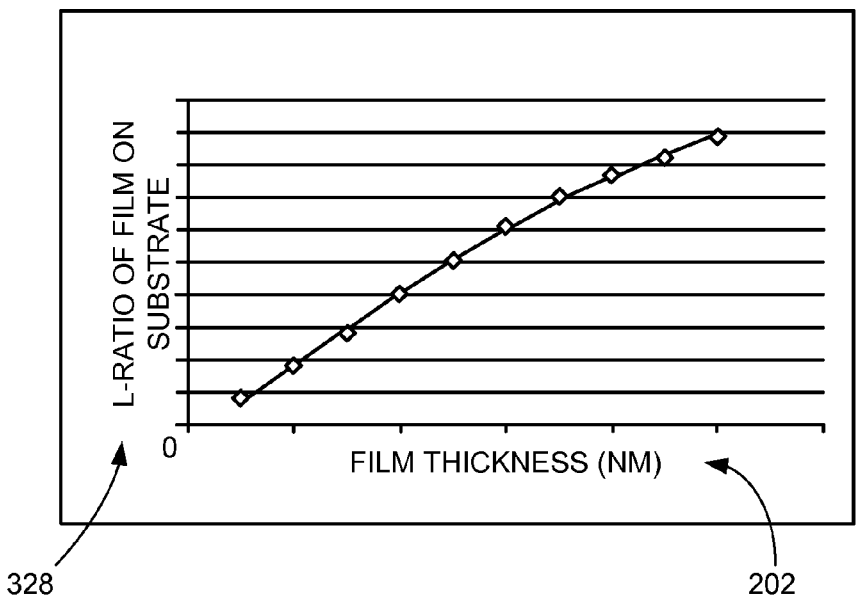
FIG. 4 is an example graph of the calibration curve.

Referring now to FIG. 4, therein is shown an example graph of the calibration curve 334. The calibration curve 334 is shown having the film L-ratios 328 of Table 1 plotted against the thickness 202 of Table 1. The thickness 202 is shown in nanometers.

The film L-ratios 328 show a positive correlation with the thickness 202. The film L-ratios 328 can increase as the thickness 202 increases. The rate of the film L-ratios 328 can decrease slightly as the thickness 202 increases. Correlating the film L-ratios 328 with the thickness 202 has the advantage that only the voltage not the current of the beam generator 102 of FIG. 1 must be controlled to compute the thickness 202 of the film 110 of FIG. 1; thus decreasing measurement time and increasing throughput.

Figure 5:
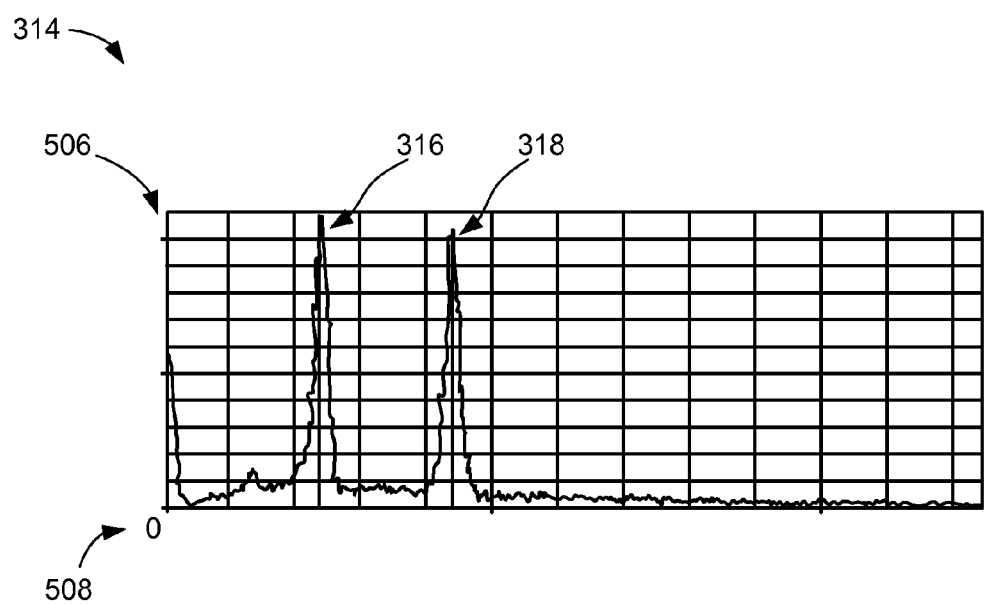
FIG. 5 is an example graph of the detection spectrum.

Referring now to FIG. 5, therein is shown an example graph of the detection spectrum 314. The detection spectrum 314 is shown with the film peak 316 next to the substrate peak 318 generated from the film 110 of FIG. 1 and the substrate 108 of FIG. 1, respectively.

The film peak 316 can be plotted based on the film signals 206 of FIG. 2 analyzed by the calculation module 120 of FIG. 1. Intensity 506 of the film peak 316 is shown along the left side of the graph. An energy range 508 of the film peak 316 is shown along a bottom side of the graph and measured in electron volts. The composition of the film 110 can be determined by the energy range 508 of the film peak 316. The film peak 316 can, for example, indicate the reference signals 114 of FIG. 1 generated by the charged particle beam 104 of FIG. 1 running at 5 kV interacting with the film 110 of copper and a small pattern structure.

The substrate peak 318 can be plotted based on the substrate signals 204 of FIG. 2 analyzed by the calculation module 120. The intensity 506 of the substrate peak 318 is shown along the left side of the graph. The energy range 508 of the substrate peak 318 is shown along the bottom side of the graph measured in electron volts. The substrate peak 318 can, for example, indicate the reference signals 114 generated by the charged particle beam 104 running at 5 kV interacting with the substrate 108 of silicon.

As an example, the detection spectrum 314 measured from 8 different locations on the specimen 106 of FIG. 1 can be used to calculate the thickness 202 of FIG. 2 by matching the film L-ratios 328 of FIG. 3 with the calibration curve 334 of FIG. 3 using Table 1 or FIG. 4.

TABLE 2

| Location | L-Ratio | Thickness (nm) |
|---|---|---|
| 1 | 0.619 | 30.489 |
| 2 | 0.597 | 29.375 |
| 3 | 0.591 | 29.090 |
| 4 | 0.611 | 30.078 |
| 5 | 0.583 | 28.694 |
| 6 | 0.630 | 31.052 |
| 7 | 0.615 | 30.285 |
| 8 | 0.546 | 26.962 |

Table 2 can exemplify the thickness 202 extracted with the film L-ratios 328 from the calibration curve 334. Table 2 shows the thickness 202 with an average value of 29.5 nm and a standard deviation of 4.1%.

Figure 6:
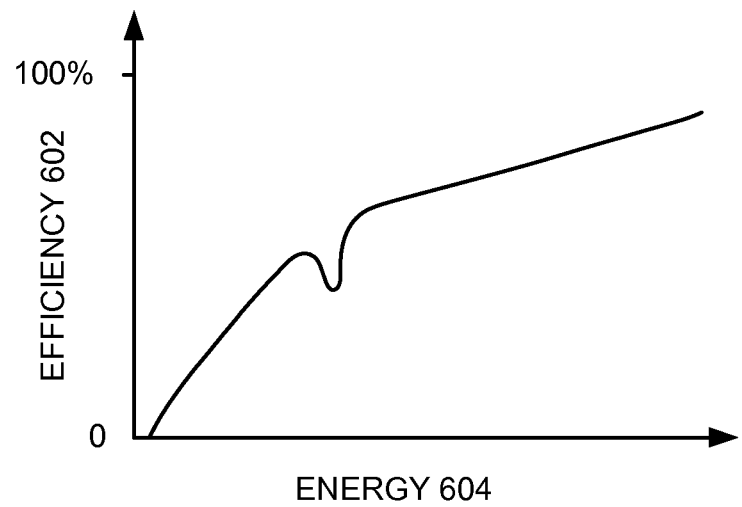
FIG. 6 is an example graph of a response function of the detectors.

Referring now to FIG. 6, therein is shown an example graph of a response function of the detectors 116 of FIG. 1. The graph depicts an efficiency 602 as a function of an energy 604 of the reference signals 114 of FIG. 1. The efficiency 602 is defined as a response of how the detectors 116 respond to captured signals. The efficiency 602 can approach 100% when the energy 604 is greater than 20,000 electron volts (eV). For example, the graph can represent an imaginary detector efficiency function.

The substrate signals 204 of FIG. 2 and the film signals 206 of FIG. 2 including electromagnetic radiation such as X-rays can be excited. The substrate signals 204 and the film signals 206 excited from electrons interaction with a sample can be a characteristic of materials of the sample. The substrate signals 204 and the film signals 206 can be described in energy in electron volts (eV). For example, all elements in the materials (except Hydrogen and Helium) can excite their characteristic (group) of X-rays.

The energy 604 of the substrate signals 204 and the film signals 206 can be element dependent. For example, Oxygen (O) excites an X-ray of 525 eV, Fluorine (F) excites an X-ray of 677 eV, and Iron (Fe) excites a group at 6404 eV, 6391 eV, 7057 eV, 705 eV, and 719 eV. From the substrate signals 204 and the film signals 206 detected, constituents of materials in the substrate 108 of FIG. 1 and the film 110 of FIG. 1, respectively, can be determined.

The response function (or detector function) of the detectors 116 can indicate how the detectors 116 respond to captured signals as well as converting and recording them. One of the most important responses can include the efficiency 602 or yield to different energies of the substrate signals 204 and the film signals 206. For example, the efficiency 602 indicates that the detectors 116 can be able to capture 75% of the substrate signals 204 or the film signals 206 of 500 eV energy or 25% of the substrate signals 204 or the film signals 206 for 250 eV energy.

Figure 7:
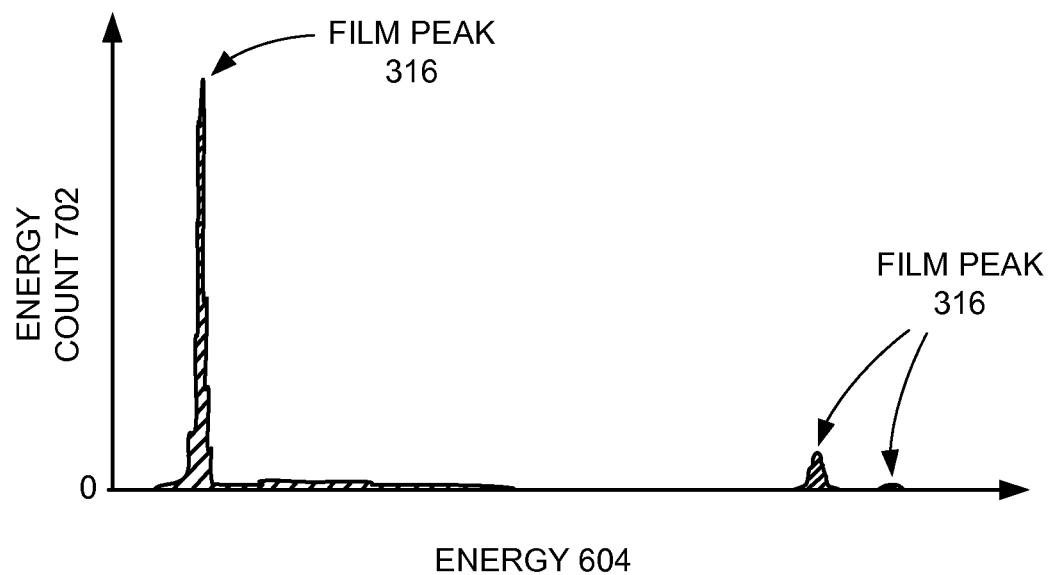
FIG. 7 is an example graph of an energy count of the film signals.

Referring now to FIG. 7, therein is shown an example graph of an energy count 702 of the film signals 206 of FIG. 2. The graph depicts the energy count 702 associated with the energy 604. The energy count 702 indicates how many of the substrate signals 204 of FIG. 2 or the film signals 206 at the energy 604. A total energy can be determined as an integral of the energy count 702 as a function of the energy 604. The graph depicts the total energy as an area, shown with a hatch pattern, under the energy count 702. For example, the graph can represent an EDS spectrum of a pure bulk copper from a 15-kV electron beam.

For example, the graph can represent the energy count 702 of the film 110 of FIG. 1 including a pure bulk copper. Also for example, the graph depicts the film peak 316 of approximately 430,000 counts, 40,000 counts, and 10,000 counts of the film signals 206 at 1 keV, 8 keV, and 9 keV, respectively.

Each of the substrate signals 204 and the film signals 206 is a single energy. When multiple of the substrate signals 204 or the film signals 206 that are the same are captured by the detectors 116 of FIG. 1, they are displayed as the film peak 316 or the substrate peak 318 of FIG. 3, respectively, from a low background. Depending on the mechanism of the detectors 116, the film peak 316 or the substrate peak 318 is not a single line on the energy 604 as shown in the graph.

How fine the detectors 116 can present the substrate signals 204 and the film signals 206 is called a resolution. The response function therefore can also be based on the resolution. For example, wavelength dispersive spectrometer (WDS) can include at least 10 times better energy resolution than energy dispersive spectrometer (EDS).

The substrate signals 204 and the film signals 206 can depend on materials and structures of the sample, energy of source electrons, direction of the source electrons traveling to the sample, and amount of the source electrons. The latter can be directly proportional to a number of controllable and measurable values including current and exposure time of the source electrons of sample exposure to electron beam.

A (small) portion of the substrate signals 204 and the film signals 206 can be captured by the detectors 116. The portion can depend on the sample, locations of the detectors 116 including a take-off angle or an angle of the detectors 116 to a sample surface and a beam impinging point, a solid angle of the detectors 116, and the response function of the detectors 116.

Therefore, detection of the substrate signals 204 and the film signals 206 can be based on a combination of factors described in two paragraphs above. Each of the film K-prime ratios 322 of FIG. 3 and the substrate K-prime ratios 324 of FIG. 3 is a ratio of intensity of the same peak between the spectra from an unknown and a reference acquired with the same conditions. The film K-prime ratios 322 and the substrate K-prime ratios 324 cancel out the response function of the detectors 116. For example, the same peak can be a peak of an X-ray at 525 eV for Oxygen.

Therefore, the film K-prime ratios 322 and the substrate K-prime ratios 324 of a sample or a sample-reference combination can be the same for different detectors. There can be multiple elements from a sample to be analyzed. Therefore, multiple references can be used. For example, during a semiconductor process, monitoring of thousands of measurements, using the film K-prime ratios 322 and the substrate K-prime ratios 324 would be based on the same current and time control/measurement for all measurements. Using the film L-ratios 328 of FIG. 3 and the substrate L-ratios 330 of FIG. 3 would ease the monitoring with the references measured under the same condition of electron current×exposure time, and for each same the X-ray is detected under the same condition of electron current×exposure time.

For the former, there can be only a few of the references to be measured for one time only. This information can be stored for subsequent measurements. For the latter, in EDS, the detectors 116 can detect all X-ray simultaneously, and therefore it is automatically fulfilled. In case of WDS and other techniques, during the short period of single sample measurement, the beam current variation can be negligible, so only timing control can be required.

The calibration curve 334 of FIG. 3 of the film L-ratios 328 or the substrate L-ratios 330 versus the thickness 202 of FIG. 2 can be stored. The calibration curve 334 can be generated from either Monte Carlo simulation or direct measurement from sample structures of the references and measured intensity from several of the references, to measure the thickness 202 if density of the film 110 is known.

The thickness 202 can be determined by a) calculating the film L-ratios 328 and the substrate L-ratios 330 by using the spectra from the sample and the references and then b) comparing the film L-ratios 328 and the substrate L-ratios 330 to the calibration curve 334. Uniformity of the thickness 202 or a percentage of the thickness 202 variation over multiple locations would not require the exact knowledge of the density of the film 110, hence is easier and more accurate. Therefore, the uniformity of the thickness 202 of the film 110 can be measured from different patterns including narrow versus thick lines, which is of vast importance. The measurement system 100 of FIG. 1 is not limited to the film 110 on the substrate 108 of FIG. 1 but multiple of the film 110 having different materials and structures on the substrate 108 can also work in the same fashion.

Figure 8:
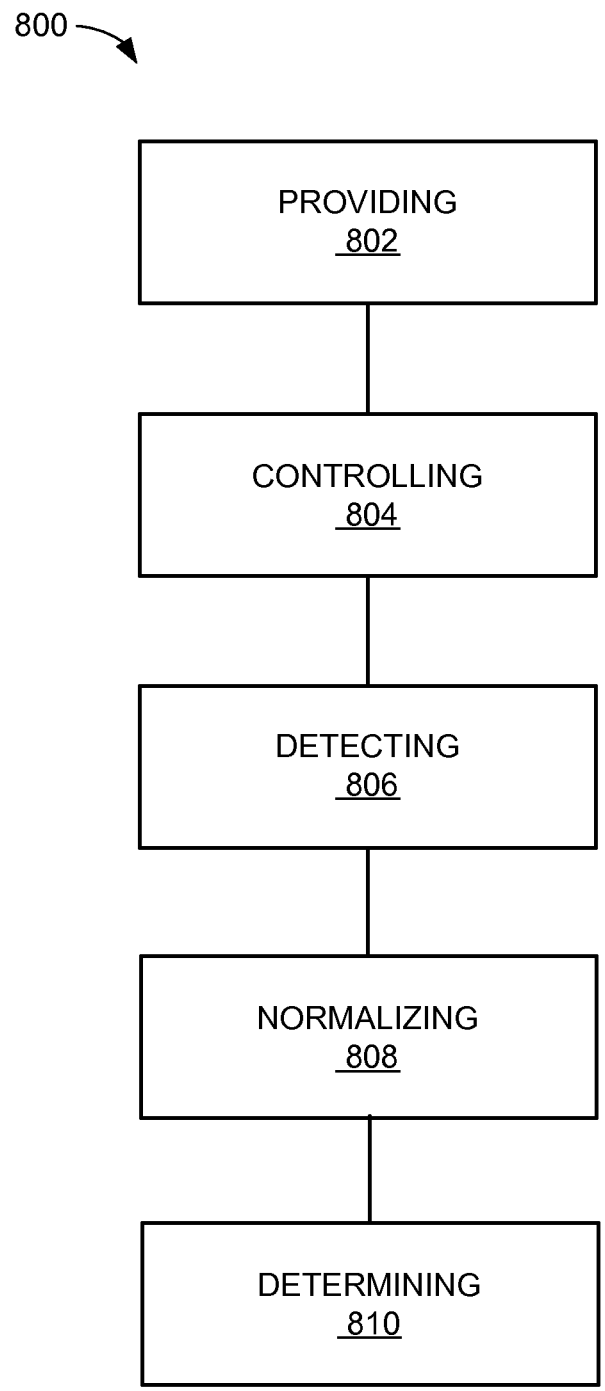
FIG. 8 is a flow chart of a method of operation of the measurement system in a further embodiment of the present invention.

Referring now to FIG. 8, therein is shown a flow chart of a method 800 of operation of the measurement system 100 of FIG. 1 in a further embodiment of the present invention. The method 800 includes: providing a specimen having a film in a block 802; controlling a beam generator to direct a charged particle beam into the specimen in a block 804; detecting a reference signal emitted from the specimen in a block 806; normalizing the reference signal to create a film L-ratio in a block 808; and determining a thickness of the film by correlating the film L-ratio to a calibration curve in a block 810.

Thus, it has been discovered that the measurement system of the present invention furnishes important and heretofore unknown and unavailable solutions, capabilities, and functional aspects for a measurement system with thickness calculation. The resulting processes and configurations are straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a measurement system comprising:
    providing a specimen having a film;
    controlling a beam generator to direct a charged particle beam into the specimen;
    detecting a reference signal emitted from the specimen;
    normalizing the reference signal to create a film L-ratio; and
    determining a thickness of the film by correlating the film L-ratio to a calibration curve.

2. The method as claimed in claim 1 wherein normalizing the reference signal includes analyzing the reference signal with a calculation module for forming a detection spectrum.

3. The method as claimed in claim 1 wherein normalizing the reference signal includes analyzing the reference signal to identify a film peak and dividing the film peak by a film-only peak for identifying a film K-prime ratio.

4. The method as claimed in claim 1 wherein normalizing the reference signal includes creating the film L-ratio by dividing a film K-prime ratio by a sum of the film K-prime ratio and a substrate K-prime ratio.

5. The method as claimed in claim 1 wherein detecting the reference signal includes detecting a film signal, a substrate signal, or a combination thereof.

6. A method of operation of a measurement system comprising:
    providing a specimen having a film with a pattern;
    controlling a beam generator to direct a charged particle beam into the specimen;
    detecting a reference signal emitted from the specimen;
    normalizing the reference signal to create a film L-ratio; and
    determining a thickness of the film by correlating the film L-ratio to a calibration curve.

7. The method as claimed in claim 6 wherein controlling the beam generator includes directing the charged particle beam into the pattern having a complex geometry.

8. The method as claimed in claim 6 wherein providing the specimen includes providing the specimen having a zero edge exclusion requirement.

9. The method as claimed in claim 6 wherein controlling the beam generator to direct the charged particle beam includes directing an electron beam.

10. The method as claimed in claim 6 wherein detecting the reference signal includes detecting the reference signal in a range of $10^2$ electron volts to $10^5$ electron volts.

11. A measurement system comprising:
    a control module for providing a specimen having a film;
    a beam generator, coupled to the control module, for directing a charged particle beam into the specimen;
    a detector, coupled to the beam generator, for detecting an reference signal emitted from the specimen; and
    an analysis unit, coupled to the detector, for normalizing the reference signal to create a film L-ratio and determining a thickness of the film by correlating the film L-ratio to a calibration curve.

12. The system as claimed in claim 11 wherein the analysis unit is for analyzing the reference signal with a calculation module for forming a detection spectrum.

13. The system as claimed in claim 11 wherein the analysis unit is for analyzing the reference signal to identify a film peak and dividing the film peak by a film-only peak for identifying a film K-prime ratio.

14. The system as claimed in claim 11 wherein the analysis unit is for creating the film L-ratio by dividing a film K-prime ratio by a sum of the film K-prime ratio and a substrate K-prime ratio.

15. The system as claimed in claim 11 wherein the detector is for detecting a film signal, a substrate signal, or a combination thereof.

16. The system as claimed in claim 11 wherein the control module is for providing the specimen having the film with a pattern.

17. The system as claimed in claim 16 wherein the beam generator is for directing the charged particle beam into the pattern having a complex geometry.

18. The system as claimed in claim 16 wherein the control module is for providing the specimen having a zero edge exclusion requirement.

19. The system as claimed in claim 16 wherein the beam generator is for directing an electron beam.

20. The system as claimed in claim 16 wherein the detector is for detecting the reference signal in a range of $10^2$ electron volts to $10^5$ electron volts.

* * * * *